(12) United States Patent
Ishiwada et al.

(10) Patent No.: US 11,161,498 B2
(45) Date of Patent: Nov. 2, 2021

(54) CONTROL APPARATUS FOR VEHICLE

(71) Applicant: TOYOTA JIDOSHA KABUSHIKI KAISHA, Toyota (JP)

(72) Inventors: Takeshi Ishiwada, Anjo (JP); Masaya Yano, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/114,805

(22) Filed: Dec. 8, 2020

(65) Prior Publication Data

US 2021/0171016 A1 Jun. 10, 2021

(30) Foreign Application Priority Data

Dec. 9, 2019 (JP) .............................. JP2019-222526

(51) Int. Cl.
| | |
|---|---|
| *B60W 10/02* | (2006.01) |
| *B60W 20/40* | (2016.01) |
| *B60W 10/06* | (2006.01) |
| *B60K 6/387* | (2007.10) |
| *B60W 30/192* | (2012.01) |

(Continued)

(52) U.S. Cl.
CPC ............ *B60W 20/40* (2013.01); *B60K 6/387* (2013.01); *B60W 10/02* (2013.01); *B60W 10/06* (2013.01); *B60W 30/18018* (2013.01); *B60W 30/192* (2013.01); *B60W 2030/203* (2013.01); *B60W 2510/0208* (2013.01); *B60W 2510/0623* (2013.01); *B60W 2510/0638* (2013.01); *B60W 2710/021* (2013.01); *B60W 2710/0644* (2013.01); *B60Y 2200/92* (2013.01)

(58) Field of Classification Search
CPC ...... B60W 20/40; B60W 10/06; B60W 10/02; B60W 2710/021; B60W 2510/0638; B60W 30/20; B60W 2030/203; B60W 30/18018; B60W 30/192
See application file for complete search history.

(56) References Cited

U.S. PATENT DOCUMENTS

| | | | | |
|---|---|---|---|---|
| 2016/0297448 | A1* | 10/2016 | Ito ......................... | B60W 10/06 |
| 2017/0174208 | A1* | 6/2017 | Peeters ............... | F02N 11/0848 |
| 2021/0188249 | A1* | 6/2021 | Kawashiri ............. | B60W 20/40 |

FOREIGN PATENT DOCUMENTS

| | | | | | |
|---|---|---|---|---|---|
| DE | 102012112609 | A1 * | 4/2014 | ............ | B60W 10/08 |
| DE | 102019116632 | A1 * | 12/2020 | ............ | B60W 30/19 |
| JP | 2006-063833 | A | 3/2006 | | |

* cited by examiner

*Primary Examiner* — Roger L Pang
(74) *Attorney, Agent, or Firm* — Oliff PLC

(57) ABSTRACT

A control apparatus for a vehicle that includes: drive wheels; an engine; a flywheel damper connected to the engine; at least one inertial body provided between the flywheel damper and the drive wheels; and a clutch for connecting and disconnecting between the flywheel damper and the at least one inertial body. In a process of reduction of a rotational speed of the engine for stopping the engine, the control apparatus keeps the clutch engaged until the rotational speed has passed through a first resonance speed range, and causes the clutch to be released before the rotational speed reaches a second resonance speed range. The first resonance speed range is a range of the rotational speed in which resonance is generated with the clutch being released. The second resonance speed range is a range of the rotational speed in which the resonance is generated with the clutch being engaged.

4 Claims, 11 Drawing Sheets

(51) Int. Cl.
*B60W 30/20* (2006.01)
*B60W 30/18* (2012.01)

CONTROL APPARATUS FOR VEHICLE

This application claims priority from Japanese Patent Application No. 2019-222526 filed on Dec. 9, 2019, the disclosure of which is herein incorporated by reference in its entirety.

FIELD OF THE INVENTION

The present invention relates to techniques for avoiding generation of resonance of a vehicle that includes a flywheel damper provided in a drive-force transmission path between an internal combustion engine and drive wheels.

BACKGROUND OF THE INVENTION

There is well-known a vehicle that includes a flywheel damper provided in a drive-force transmission path between an internal combustion engine and drive wheels. JP-2006-63833A discloses such a vehicle. In the vehicle disclosed in the Japanese Patent Application Publication, the flywheel damper is provided in an engine as the internal combustion engine, and, when the engine is to be started, it is determined whether a rotational speed of the engine is held within a resonance speed range for a predetermined length of time or longer, wherein the resonance speed range is a speed range corresponding to a resonance frequency of the flywheel damper. In a case in which it is determined that the engine rotational speed is held within the resonance speed range for the predetermined length of time or longer, a fuel injection amount is increased, for thereby causing the engine rotational speed to be quickly deviated from the resonance speed range and assuring a satisfactory startability of the engine.

SUMMARY OF THE INVENTION

By the way, although being effective when the internal combustion engine is to be started, the technique disclosed in the above-identified Japanese Patent Application Publication is not effective when the internal combustion engine is to be stopped, because the deviation of the engine rotational speed from the resonance speed range is intended by increase of the fuel injection amount in the disclosed technique. Therefore, there is a problem that it is not possible to avoid the resonance that could be generated when the internal combustion engine is to be stopped.

The present invention was made in view of the background art described above. It is therefore an object of the present invention to provide a control apparatus for a vehicle that includes an internal combustion engine and a flywheel damper connected to the internal combustion engine wherein the control apparatus is capable of avoiding resonance from being generated when the internal combustion engine is to be stopped.

The object indicated above is achieved according to the following aspects of the present invention.

According to a first aspect of the invention, there is provided a control apparatus for a vehicle that that includes: drive wheels; an internal combustion engine; a flywheel damper connected to the internal combustion engine; at least one inertial body provided in a drive-force transmission path between the flywheel damper and the drive wheels; and a clutch configured to connect and disconnect between the flywheel damper and the at least one inertial body, the control apparatus comprising an internal-combustion-engine stop control portion configured, in a process of reduction of a rotational speed of the internal combustion engine when the internal combustion engine is to be stopped, to keep the clutch engaged in a stage until the rotational speed of the internal combustion engine has passed through a first resonance speed range, and to cause the clutch to be released before the rotational speed of the internal combustion engine enters or reaches a second resonance speed range, wherein the first resonance speed range is a range of the rotational speed in which resonance is generated with the clutch being released, and wherein the second resonance speed range is a range of the rotational speed in which the resonance is generated with the clutch being engaged.

According to a second aspect of the invention, the control apparatus according to the first aspect of the invention further comprises an internal-combustion-engine start control portion configured, in a process of increase of the rotational speed of the internal combustion engine when the internal combustion engine is to be started, to keep the clutch released in a stage until the rotational speed of the internal combustion engine has passed through the second resonance speed range, and to cause the clutch to be engaged before the rotational speed of the internal combustion engine reaches the first resonance speed range.

According to a third aspect of the invention, in the control apparatus according to the first aspect of the invention, the internal-combustion-engine stop control portion is configured, when it is determined that the internal combustion engine is to be stopped, to stop supply of a fuel to the internal combustion engine.

According to a fourth aspect of the invention, in the control apparatus according to any one of the first through third aspects of the invention, the vehicle further includes an electric motor that is provided between the flywheel damper and the drive wheels, wherein the at least one inertial body includes a rotor of the electric motor.

In the control apparatus according to the first aspect of the invention, in the process of reduction of the rotational speed of the internal combustion engine when the internal combustion engine is to be stopped, the clutch is kept engaged in the stage until the rotational speed of the internal combustion engine has passed through the first resonance speed range, namely, in the stage until the rotational speed becomes lower than the first resonance speed range, whereby generation of the resonance is avoided when the rotational speed of the internal combustion engine passes through the first resonance speed range. Further, the clutch is caused to be released, after the rotational speed of the internal combustion engine has passed through the first resonance speed range before entering or reaching the second resonance speed range, whereby generation of the resonance is avoided when the rotational speed of the internal combustion engine passes through the second resonance speed range. Thus, by causing the clutch to be released at an appropriate timing in the process of reduction of the rotational speed of the internal combustion engine when the internal combustion engine is to be stopped, it is possible to advantageously avoid generation of the resonance in an engine stop process of the internal combustion engine.

In the control apparatus according to the second aspect of the invention, in the process of increase of the rotational speed of the internal combustion engine when the internal combustion engine is to be started, the clutch is kept released in the stage until the rotational speed of the internal combustion engine has passed through the second resonance speed range, namely, in the stage until the rotational speed becomes higher than the second resonance speed range, whereby generation of the resonance is avoided when the rotational speed of the internal combustion engine passes through the second resonance speed range. Further, the clutch is caused to be engaged, after the rotational speed of the internal combustion engine has passed through the second resonance speed range before entering or reaching the first resonance speed range, whereby generation of the resonance is avoided when the rotational speed of the internal combustion engine passes through the first resonance speed range. Thus, by causing the clutch to be engaged at an appropriate timing in the process of increase of the rotational speed of the internal combustion engine when the internal combustion engine is to be started, it is possible to advantageously avoid generation of the resonance in an engine start process of the internal combustion engine.

In the control apparatus according to the third aspect of the invention, when it is determined that the internal combustion engine is to be stopped, the supply of the fuel to the internal combustion engine is stopped, namely, a fuel cut to the internal combustion engine is executed. By causing the clutch to be released at an appropriate timing in the process of reduction of the rotational speed of the internal combustion engine, it is possible to advantageously avoid the resonance which could be generated if the rotational speed passes through the resonance speed range in the process of the reduction of the rotational speed.

In the control apparatus according to the fourth aspect of the invention, the at least one inertial body includes the rotor of the electric motor, so that an inertial mass of the at least one inertial body is increased. By the increase of the inertial mass, a deviation amount between the first and second resonance speed ranges is increased whereby a length of time required by change of the engine rotational speed between the first and second resonance speed ranges is increased. Therefore, it is possible to increase a length of time within which the clutch is to be released or engaged.

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
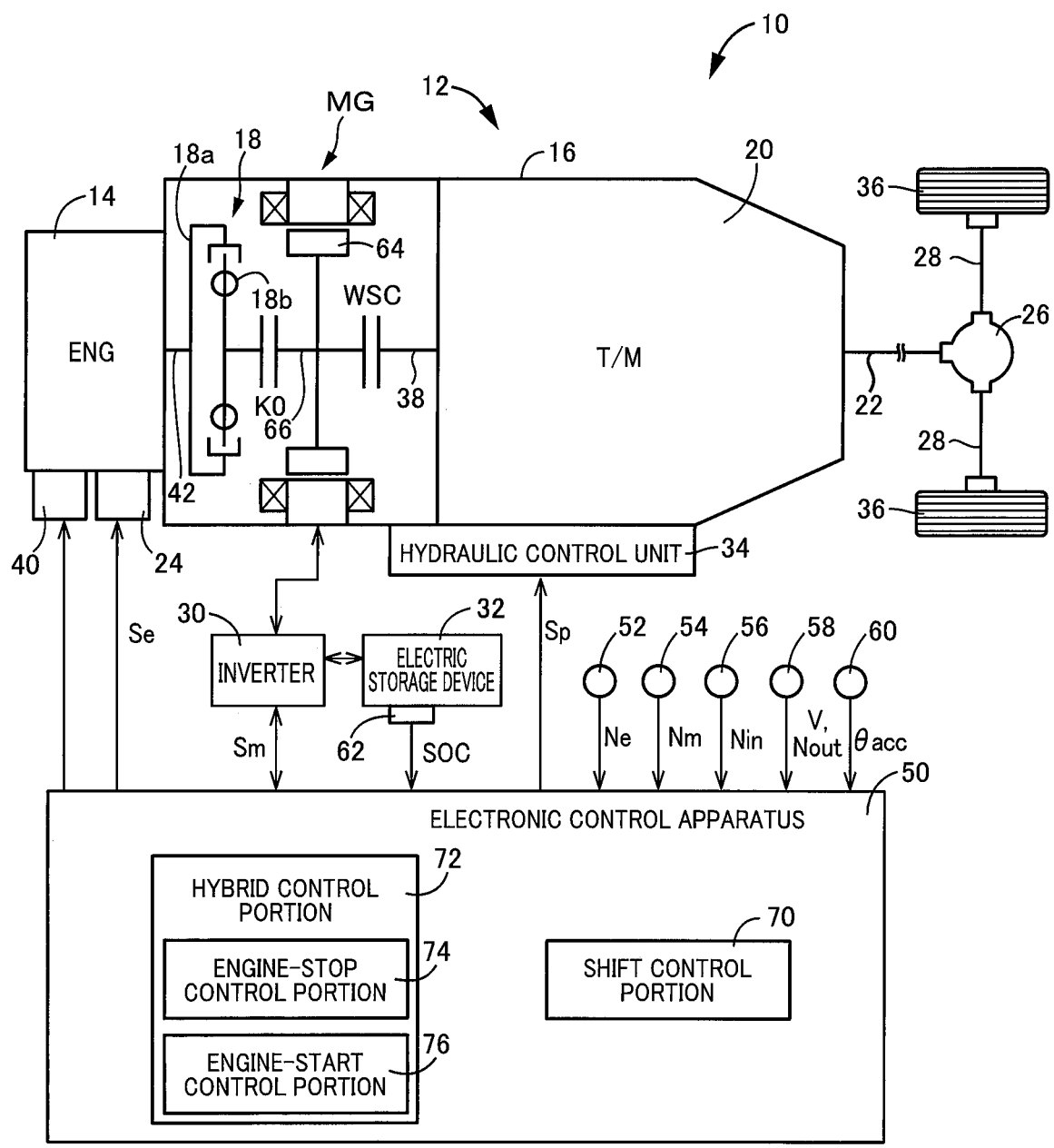
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid vehicle including an engine 14 and an electric motor MG as drive force sources for enabling the vehicle 10 to run. The vehicle 10 further includes drive wheels 36 and a drive-force transmitting apparatus 12 that is disposed between the engine 14 and the drive wheels 36. The drive-force transmitting apparatus 12 includes a transmission case 16 as a non-rotary member, a flywheel damper 18, a first clutch K0, the above-described electric motor MG, a second clutch WSC and an automatic transmission 20, such that the flywheel damper 18, first clutch K0, electric motor MG, second clutch WSC and automatic transmission 20 are arranged in this order of description in a direction away from the engine 14 and are disposed inside the transmission case 16. The drive-force transmitting apparatus 12 further includes a differential gear 26 and a pair of right and left axles 28. The differential gear 26 is connected to an output shaft 22 that is an output rotary member of the automatic transmission 20. The axles 28 are connected to the differential gear 26. The drive-force transmitting apparatus 12 constructed as described above is advantageously used for, for example, the vehicle 10 of FR (front engine/rear drive) type. The first clutch K0 is capable of connecting and cutting off a drive-force transmission path between the flywheel damper 18 and at least one inertial body that is constituted by a rotor 64 and a connection shaft 66 described below in the present embodiment. It is noted that the first clutch K0 corresponds to "a clutch (configured to connect and disconnect between the flywheel damper and the at least one inertial body)" that is recited in the appended claims.

The vehicle 10 further includes an inverter 30 configured to control operation of the electric motor MG, an electric storage device 32 configured to supply and receive an electric power to and from the electric motor MG through the inverter 30, and a hydraulic control unit (hydraulic control circuit) 34 configured to control, for example, shifting actions of the automatic transmission 20, engaging/releasing actions of the first clutch K0 and engaging/releasing actions of the second clutch WSC.

The engine 14 is constituted by a known internal combustion engine such as a gasoline engine and a diesel engine, and is to be controlled by an engine control device 24 that includes an electronic throttle valve, a fuel injection device and an ignition device. With the engine control device 24 being controlled by the electronic control apparatus 50, an engine torque Te, which is an output torque of the engine 14, is controlled. The engine 14 is provided with a starter motor 40 that is to be controlled by the electronic control apparatus 50 so as to crank a crank shaft 42 when the engine 14 is to be started.

The flywheel damper 18 is connected to the crank shaft 42 of the engine 14, and includes a flywheel 18*a* and springs 18*b* that serves to absorb fluctuation of a rotational speed of the engine 14 so as to reduce vibration. Since the flywheel damper 18 is a prior art damper, its detailed description is not provided. The first clutch K0 is provided to connect and disconnect the engine 14 to and from the electric motor MG and the automatic transmission 20. The second clutch WSC is provided on an input shaft 38 of the automatic transmission 20, so as to connect and disconnect the engine 14 and the electric motor MG to and from the automatic transmission 20.

The automatic transmission 20 is configured to transmit a drive force of the engine 12 and/or a drive force of the electric motor MG, toward the drive wheels 36. The automatic transmission 20 is a known automatic transmission of planetary gear type in which a selected one of a plurality of gear positions (speed positions) is established by a shifting action executed, for example, by releasing and engaging actions of selected ones of a plurality of engagement devices, namely, by a releasing action of at least one of the engagement devices and an engaging action of at least one of the engagement devices. The automatic transmission 20 is a step-variable transmission configured to execute a so-called "clutch-to-clutch" shifting operation, and a rotary motion of the input shaft 38 is transmitted to the output shaft 22, at a gear ratio γ established in the automatic transmission 20. The plurality of engagement devices are hydraulically-operated frictional engagement devices, each of which is to be controlled by the hydraulic control unit 34 so as to be engaged and released, such that a pressure of a corresponding solenoid valve provided in the hydraulic control unit 34 is regulated whereby a torque capacity, i.e., an engaging force of each of the engagement devices is controlled, and such that each of the engagement device connects between members that are disposed on respective opposite sides of the each of the engagement device when being engaged. Hereinafter, the plurality of engagement devices will be referred to as clutches C unless they are to be distinguished from one another.

The electric motor MG is a so-called "motor generator" having a function serving as a motor configured to generate an electric power from an electric energy and a function serving as a generator configured to generate a mechanical energy from an electric energy. In place of or in addition to the engine 14, the electric motor MG generates a drive force by the vehicle 10 is caused to run, wherein the drive force generated by the electric motor MG is based on an electric power (that is synonymous to the electric energy unless otherwise specified) supplied from the electrical storage device 32 via the inverter 30. The electric motor MG converts the drive force generated by the engine 14 and a driven force supplied from the drive wheels 36, into the electric power by regeneration, and stores the regenerated electric power into the electrical storage device 32 through the inverter 30. The electric motor MG is connected to the engine 14 through the first clutch K0 and the flywheel damper 18 is a drive-force transmittable manner, and is connected also to the automatic transmission 20 through the second clutch WSC in a drive-force transmittable manner.

The vehicle 10 is capable of running in a selected one of an EV running mode (electric-motor running running) and an HV running mode (hybrid running mode). Specifically, in the EV mode that is to be selected in a region requiring a low required driving force, i.e., a low load, the vehicle 10 is caused to run by the electric motor MG as the drive force source that is subjected to a power-running control with the rotation of the engine 14 being stopped. In the HV running mode, the vehicle 10 is caused to run by at least the engine 14 as the drive force source. That is, the term "HV running" encompasses a running by both of the engine 14 and the electric motor MG serving as the drive force sources, a running by only the engine 14 serving as the drive force source, and a running by the engine 14 as serving as the drive force source, with the electric motor MG being subjected to a regenerative control so as to generate a reaction force.

Each of the first clutch K0 and the second clutch WSC is, for example, a hydraulically-operated frictional engagement device of wet multi-plate type, which is controlled by the hydraulic control unit 34 using an original pressure in the form of a hydraulic pressure generated by an oil pump (not shown), so as to be engaged and released. In the control for engaging and releasing each of the first clutch K0 and the second clutch WSC, a torque capacity Tk0 of the first clutch K0 and a torque capacity Twsc of the second clutch WSC is changed, for example, by regulation of a solenoid valve or the like (not shown) that is included in the hydraulic control unit 34.

The vehicle 10 is provided with the electronic control apparatus 50 including a control apparatus for the vehicle 10, which relates to, for example, operation of the first clutch K0. For example, the electronic control apparatus 50 includes a so-called "microcomputer" incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 50 is configured to perform, for example, an engine control operation for controlling an output of the engine 14, an electric-motor control operation for controlling the drive force of the electric motor MG, a shift control operation for controlling a shifting action of the automatic transmission 20 and a torque-capacity control operation for controlling the torque capacity of each of the first clutch K0 and the second clutch WSC, wherein the electric-motor control operation includes a regenerative control of the electric motor MG. The electronic control apparatus 50 may be constituted by two or more control units exclusively assigned to perform different control operations such as the engine control operation, the electric-motor control operation and a hydraulic-pressure control operation.

The electronic control apparatus 50 receives various input signals based on values detected by respective sensors provided in the vehicle 10. Specifically, the electronic control apparatus 50 receives: an output signal of an engine speed sensor 52 indicative of an engine rotational speed Ne as a rotational speed of the engine 14; an output signal of an MG speed sensor 54 indicative of an MG rotational speed Nm as a rotational speed of the electric motor MG; an output signal of an input speed sensor 56 indicative of an input-shaft rotational speed Nin as a rotational speed of the input shaft 38; an output signal of an output speed sensor 58 indicative of an output-shaft rotational speed Nout as a rotational speed of the output shaft 22 which corresponds to the running speed V of the vehicle 10; an output signal of an accelerator-opening degree sensor 60 indicative of an accelerator opening degree (accelerator operation degree) θacc corresponding to a required drive force of the vehicle 10 required by a driver of the vehicle 10 (hereinafter simply referred to as "vehicle driver"); and an output signal of a battery sensor 62 indicative of a charged state value (charged capacity) SOC of the electric storage device 32. Further, the electronic control apparatus 50 generates various output signals which are supplied to various devices such as the hydraulic control unit 34 and which include an engine-control command signal Se for controlling the output of the engine 12, an electric-motor-control command signal Sm for controlling the operation of the electric motor MG, and a hydraulic-control command signal Sp for engaging and releasing each of the first clutch K0 and the second clutch WSC and executing shifting actions of the automatic transmission 20.

The electronic control apparatus 50 functionally includes a shift control portion 70 serving as a shift control means, a hybrid control portion 72 serving as a hybrid control means, an engine-stop control portion 74 serving as an engine-stop control means and an engine-start control portion 76 serving as an engine-start control means. It is noted that the engine-stop control portion 74 and the engine-start control portion 76 correspond to "internal-combustion-engine stop control portion" and "internal-combustion-engine start control portion", respectively, which are recited in the appended claims.

The shift control portion 70 is configured to execute a shift control operation of the automatic transmission 20. To this end, the shift control portion 70 determines whether a shifting action is to be executed or not in the automatic transmission 20, namely, determines which one of the gear positions should be established in the automatic transmission 20, based on, for example, a vehicle state represented by actual values of the running speed V and the accelerator opening degree (accelerator operation degree) θacc, in accordance with a known relationship in the form of a shifting map (shifting diagram) including shift-up lines and shift-down lines, with parameters in the form of the running speed V and the accelerator opening degree θacc, and executes the shift control operation such that the determined one of the gear positions is established in the automatic transmission 20.

When the vehicle state of the vehicle 10 is moved across one of the shift-up lines and the shift-down lines as a result of change or changes of the running speed V and/or the accelerator opening degree (accelerator operation degree) θacc, the shift control portion 70 executes the shift control operation of the automatic transmission 20 which corresponds to the movement of the running state across the one of the shift-up lines and the shift-down lines. In this instance, the shift control portion 70 supplies, to the hydraulic control unit 34, the hydraulic-control command signal Sp requesting involved ones of the engagement devices (that are involved in the shifting action) to be engaged and released in accordance with a pre-stored table indicating a relationship between each of the gear positons and at least one the engagement devices that are to be engaged to establish the each of the gear positions, such that determined one of the gear positions is established in the automatic transmission 20. In response to the hydraulic-control command signal Sp, the hydraulic control unit 34 operates linear solenoid valves (that are provided in the hydraulic control unit 34), for operating hydraulic actuators of the respective involved ones of the engagement devices, so as to execute the shifting action of the automatic transmission 20 by releasing at least one of the engagement devices that is to be engaged for the shifting action and engaging at least one of the engagement devices that is to be released for the shifting action.

The hybrid control portion 72 includes a function serving as an engine drive control portion for controlling driving of the engine 14 and a function serving as an electric-motor operation control portion for controlling driving of the electric motor MG and electric generation of the electric motor MG through the inverter 30. With these control functions, the hybrid control portion 72 executes, for example, a hybrid drive control operation that is to be executed by cooperation of the engine 14 and the electric motor MG. The hybrid control portion 72 calculates a required torque required by the vehicle 10, for example, from the accelerator opening degree (accelerator operation degree) θacc and the running speed V, and controls the engine 14 and the electric motor MG by taking account of various factors such as a transmission loss, an auxiliary load, a currently selected one of the gear positions of the automatic transmission 20 and the charged state value SOC of the electric storage device 32, such that the required torque required by the vehicle 10 is obtained.

Described more specifically, when the above-described required torque is in a range that can be covered by only an electric motor torque Tm as an output torque of the electric motor MG, the hybrid control portion 72 establishes the EV running mode in which the vehicle 10 is caused to perform an EV running (electric motor running) with only the electric motor MG serving as the drive force source. On the other hand, when the required torque is in a range that cannot be covered without at least an engine torque Te of the engine 14, the hybrid control portion 72 establishes the HV running mode in which the vehicle 10 is caused to perform an engine running with at least the engine 14 serving as the drive force source. Thus, the hybrid control portion 72 causes the vehicle 10 to run in one of the EV running mode (electric-motor running running) and the HV running mode (hybrid running mode), which is selected depending on the running state of the vehicle 10.

When selecting the EV running mode, the hybrid control portion 72 causes the first clutch K0 and the second clutch WSC to be released and engaged, respectively, and causes the electric motor MG to output the electric motor torque Tm required for the EV running. On the other hand, when selecting the HV running mode, the hybrid control portion 72 causes the first clutch K0 and the second clutch WSC to be both engaged, and controls the engine torque Te of the engine 14 and the electric motor torque Tm of the electric motor MG such that a sum of the engine torque Te and the electric motor torque Tm corresponds to the required torque required by the vehicle 10.

During a coast running (inertia running) with the accelerator opening degree θacc being zero (acceleration OFF) or a braking with a braking pedal being depressed, the hybrid control portion 72 serves as a regenerative control portion that is configured to drive the electric motor MG by a kinetic energy of the vehicle 10, i.e. the driven torque transmitted from the drive wheels 36 toward the engine 14, so as to cause the electric motor MG to be operated as the electric generator to generate an electric energy, and to charge the electric storage device 32, through the inverter 30, with the generated electric energy, for thereby improving a fuel efficiency. When serving as the regenerative control portion, the hybrid control portion 72 controls an amount of regenerative electric power to an amount that is determined based on the charged state value SOC of the electric storage device 32 and a distribution of a hydraulic brake force for obtaining a braking force dependent on an amount of operation of the braking pedal.

There will be next described a control operation executed when the engine 14 is to be stopped. When an engine-stop command signal is outputted to stop the engine 14 that in an operated state, the engine-stop control portion 74 executes an engine-stop control operation for stopping the engine 14. The engine-stop command signal is outputted, for example, (i) when an engine stop operation is made by the vehicle driver to stop the engine 14 during stop of the vehicle 10, (ii) when the vehicle 10 running in the HV running mode enters into an operation region in which the EV running mode is to be established, and (iii) when the charged state value SOC of the electric storage device 32 has reached a predetermined upper limit threshold and an electric generation by drive of the engine 14 has become unrequired during the electric generation by drive of the engine 14.

When the engine-stop command signal has been outputted, the engine-stop control portion 74 determines whether the vehicle 10 is running or not. There will be first described the engine-stop control operation that is to be executed when it is determined that the vehicle 10 is stopped. When it is determined that the vehicle 10 is stopped, the second clutch WSC is placed in its released state. In this instance, engine-stop control portion 74 executes a fuel cut to stop supply of a fuel to the engine 14 whereby the engine rotational speed Ne is reduced toward zero. In a process of the reduction of the engine rotational speed Ne toward zero, resonance is generated in a stage in which the engine rotational speed Ne passes through a resonance speed range corresponding to a resonance frequency of the flywheel damper 18. Since the fuel cut is executed to the engine 14 and the engine rotational speed Ne is reduced by the execution of the fuel cut, it is difficult to reduce a length of time for which the engine rotational speed Ne is within the resonance speed range. However, the engine-stop control portion 74 causes the first clutch K0 to be released at an appropriate timing in the process of the reduction of the engine rotational speed Ne, for thereby avoiding the engine rotational speed Ne from passing through the resonance speed range and accordingly avoiding the resonance that is to be generated when the engine rotational speed Ne passes through the resonance speed range.

The resonance speed range varies depending on an operation state of the first clutch K0, namely, depending on whether the first clutch K0 is placed in its engaged state or its released state, because the resonance frequency of the flywheel damper 18 is changed by the engagement of the first clutch K0 by which at least one inertial body disposed on a downstream side of the first clutch K0 (namely, disposed between the first clutch K0 and the drive wheels 36) is connected to the flywheel damper 18. Specifically, in a state in which the first clutch K0 is engaged with the second clutch WSC being released, the above-described at least one inertial body consists of inertial bodies including a rotor 64 of the electric motor MG and a connection shaft 66 connecting the first clutch K0 and the rotor 64 is connected to the flywheel damper 18 (see FIG. 1). The rotor 64 and the connection shaft 66 as the inertial bodies are disposed on a drive-force transmission path between the flywheel damper 18 and the drive wheels 36. The first clutch K0 serves as a connecting/disconnecting mechanism configured to connect and disconnect between the flywheel damper 18 and the inertial bodies that include the rotor 64 and the connection shaft 66.

The resonance speed range is lower when the first clutch K0 is placed in the engaged state than when the first clutch K0 is placed in the released state. Further, the resonance speed range with the first clutch K0 being placed in the engaged state is deviated from the resonance speed range with the first clutch K0 being placed in the released state by a large amount, because the rotor 64 of the electric motor MG as one of the inertial bodies has a relatively large weight or mass is connected to the flywheel damper 18. Hereinafter, the resonance speed range of the engine rotational speed Ne with the first clutch K0 being placed in the released state will be referred to as "first resonance speed range Wrh", while the resonance speed range of the engine rotational speed Ne with the first clutch K0 being placed in the engaged state will be referred to as "second resonance speed range Wrl". It is noted that the rotor 64 and the connection shaft 66 corresponds to "at least one inertial body (provided in a drive-force transmission path between the flywheel damper and the drive wheels)" recited in the appended claims.

When the engine 14 is to be stopped, the engine-stop control portion 74 avoids generation of the resonance in the process of reduction of the engine rotational speed Ne, by causing the first clutch K0 to be released at an appropriate timing so as to avoid the engine rotational speed Ne from passing through the resonance speed range. During stop of the vehicle 10, when the engine-stop command signal is outputted as a result of determination that the engine 14 is to be stopped, the engine-stop control portion 74 executes the fuel cut to the engine 14 in a state in which the first clutch K0 is engaged. During the stop of the vehicle 10, the second clutch WSC is released. The engine rotational speed Ne is reduced by execution of the fuel cut. It is noted that if the first clutch K0 is released at a point of time at which the engine-stop command signal is outputted, the first clutch K0 is immediately placed into the engaged state. In this instance, the resonance speed range of the engine rotational speed Ne is the second resonance speed range Wrl in which the resonance is to be generated with the first clutch K0 being engaged.

Then, the engine-stop control portion 74 determines whether the engine rotational speed Ne has passed through the first resonance speed range Wrh in which the resonance is to be generated with the first clutch K0 being released. Specifically described, the engine-stop control portion 74 determines whether the engine rotational speed Ne has becomes lower than a first determination value $X1(=Nrh-A)$ that is obtained by subtracting a first predetermined value A from a clutch-release resonance rotational speed Nrh that is a representative value within the first resonance speed range Wrh in which the resonance is to be generated with the first clutch K0 being released.

The clutch-release resonance rotational speed Nrh as the representative value within the first resonance speed range Wrh is set to a speed value of the engine rotational speed Ne at which an amplitude of the resonance is maximized within the first resonance speed range Wrh in which the amplitude of the resonance is not smaller than a predetermined amplitude value. The first predetermined value A is set to a value such that the first determination value $X1(=Nrh-A)$, which is obtained by subtracting the first predetermined value A from the clutch-release resonance rotational speed Nrh, is not higher than a lower limit of the first resonance speed range Wrh in which the amplitude of the resonance is not smaller than the predetermined amplitude value. Further, the first predetermined value A is set to the value, by taking account of also variations of components, such that the first determination value X1 is reliably deviated from the first resonance speed range Wrh.

It is determined that the engine rotational speed Ne has not yet passed through the first resonance speed range Wrh in which the resonance is to be generated with the first clutch K0 being released, as long as the engine rotational speed Ne is not lower than the first determination value X1. As long as it is determined that the engine rotational speed Ne has not yet passed through the first resonance speed range Wrh, the engine-stop control portion 74 keeps the first clutch K0 engaged.

When the engine rotational speed Ne has become lower than the first determination value X1, it is determined that the engine rotational speed Ne has passed through the first resonance speed range Wrh. In a stage in which the engine rotational speed Ne passes through the first resonance speed range Wrh, the first clutch K0 is engaged whereby the resonance speed range of the engine rotational speed Ne is the second resonance speed range Wrl, so that the resonance is not generated. In this instance when engine rotational speed Ne has become lower than the first determination value X, namely, when determining that the engine rotational speed Ne has passed through the first resonance speed range Wrh, the engine-stop control portion 74 causes the first clutch K0 to be released. With the first clutch K0 being released, the resonance speed range of the engine rotational speed Ne becomes the first resonance speed range Wrh in which the resonance is to be generated with the first clutch K0 being released. Since the engine rotational speed Ne is reduced to be deviated from the first resonance speed range Wrh in a state in which the first clutch K0 is released, namely, in which the resonance speed range of the engine rotational speed Ne is the first resonance speed range Wrh, the resonance is not generated in a stage in which the engine rotational speed Ne passes through the second resonance speed range Wrl. Thus, in the process of reduction of the engine rotational speed Ne during execution of the engine-stop control operation, the engine rotational speed Ne is avoided from passing through the resonance speed range.

The engine-stop control portion 74 causes the first clutch K0 to be released in a stage after the engine rotational speed Ne has passed through the first resonance speed range Wrh and before the engine rotational speed Ne enters or reaches the second resonance speed range Wrl. As a result of release of the first clutch K0, the resonance speed range of the engine rotational speed Ne is switched from the second resonance speed range Wrl to the first resonance speed range Wrh before the engine rotational speed Ne reaches the second resonance speed range Wrl. Consequently, the resonance is not generated in a stage in which the engine rotational speed Ne passes through the second resonance speed range Wrl.

There will be next described the engine-stop control operation in a case in which it is determined that the vehicle 10 is running at a point of time at which the engine-stop command signal is outputted. In the case in which it is determined that the vehicle 10 is running at the point of time at which the engine-stop command signal is outputted, it is common that the second clutch WSC is placed in its engaged state. In this instance, the engine-stop control portion 74 causes the second clutch WSC to be released for temporarily cutting off the drive-force transmission path between the engine 14 and the drive wheels 36 during execution of the engine-stop control operation. Then, the engine-stop control portion 74 executes the fuel cut to the engine 14. Further, as in the above-described case in which it is determined that the vehicle 10 is stopped at the point of time at which the engine-stop command signal is outputted, the engine-stop control portion 74 determines whether the engine rotational speed Ne has passed through the first resonance speed range Wrh. When the engine rotational speed Ne has become lower than the first determination value, namely, when determining that the engine rotational speed Ne has passed through the first resonance speed range Wrh, the engine-stop control portion 74 causes the first clutch K0 to be released, before the engine rotational speed Ne reaches the second resonance speed range Wrl. Further, the engine-stop control portion 74 determines whether the vehicle 10 is running or not. When determining that the vehicle 10 is running, the engine-stop control portion 74 causes the second clutch WSC to be engaged so as to keep the vehicle 10 running by operation of the electric motor MG.

Figure 2:
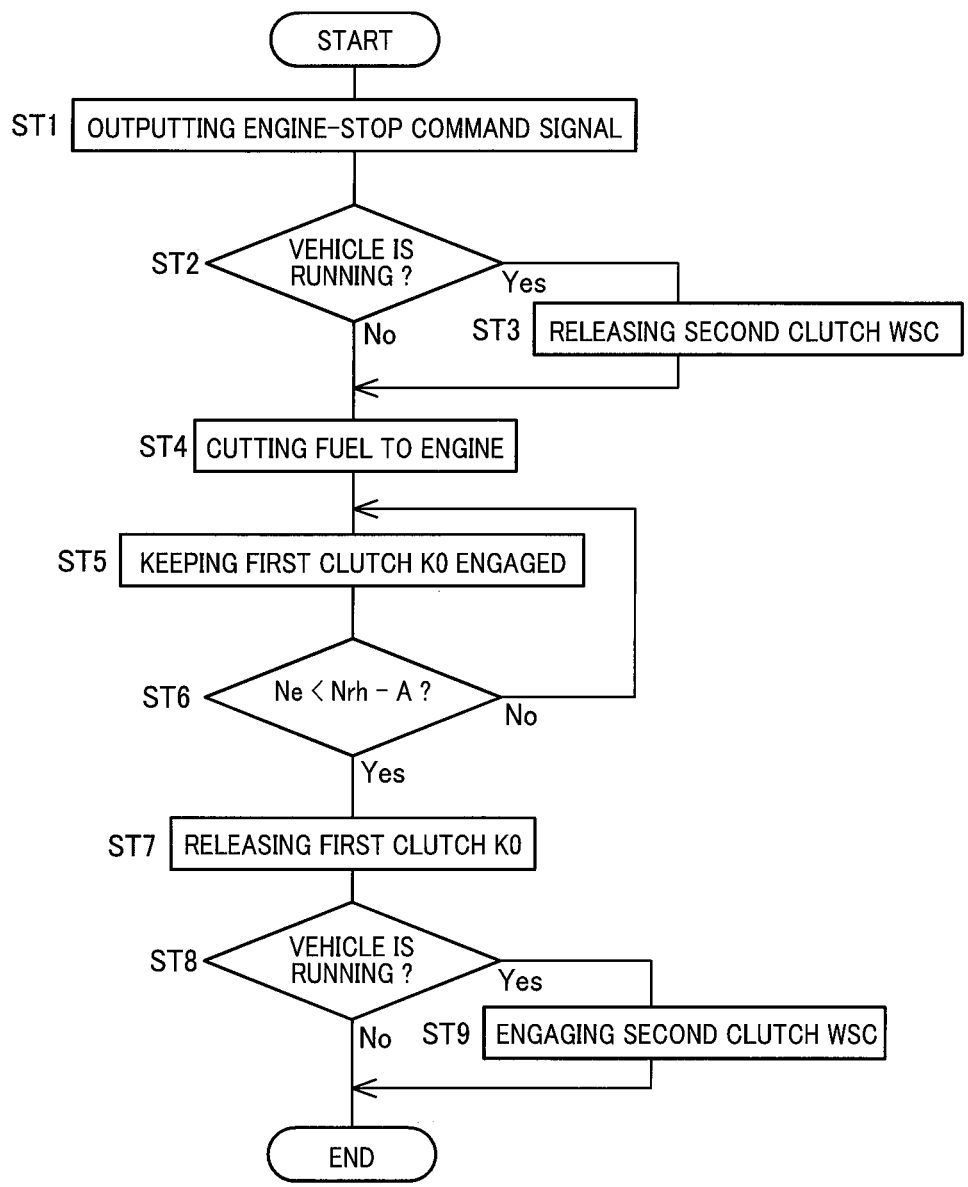
FIG. 2 is a flow chart showing a main part of a control routine executed by an electronic control apparatus shown in FIG. 1, namely, a control routine that is executed for avoiding resonance that could be generated in execution of an engine-stop control operation.

FIG. 2 is a flow chart showing a main part of a control routine executed by the electronic control apparatus 50, namely, a control routine that is executed for avoiding the resonance that could be generated in execution of the engine-stop control operation. This control routine is executed each time it is determined that the engine 14 is to be stopped either during stop of the vehicle 10 or during running of the vehicle 10. It is noted that, in an example of the control routine shown in the flow char of FIG. 2, the first clutch K0 is placed in the engaged state at a point of time at which it is determined that the engine 14 is to be stopped.

The control routine is initiated with step ST1 corresponding to control function of the engine-stop control portion 74, which is implemented to output the engine-stop command signal. Step ST1 is followed by step ST2 corresponding to control function of the engine-stop control portion 74, which is implemented to determine whether the vehicle 10 is running or not. When a negative determination is made at step ST2, namely, when it is determined that the vehicle 10 is stopped, the control flow goes to step ST4. On the other hand, when an affirmative determination is made at step ST2, step ST3 corresponding to control function of the engine-stop control portion 74 is implemented to release the second clutch WSC, and then step ST3 is followed by step ST4. At step ST4 corresponding to control function of the engine-stop control portion 74, the fuel cut is executed to stop supply of the fuel to the engine 14. Then, step ST5 corresponding to control function of the engine-stop control portion 74 is implemented to keep the first clutch K0 engaged. Step ST5 is followed by step ST6 corresponding to control function of the engine-stop control portion 74, which is implemented to determine whether the engine rotational speed Ne has become lower than the first determination value(=Nrh−A) or not. When a negative determination is made at step ST6, the control flow goes back to step ST5. When an affirmative determination is made at step ST6, step ST7 corresponding to control function of the engine-stop control portion 74 is implemented to release the first clutch K0, such that the first clutch K0 is switched from the engaged state to the released state before the engine rotational speed Ne reaches the second resonance speed range Wrl in which the resonance is to be generated with the first clutch K0 being engaged. With the engine-stop control operation being executed as described above, the engine rotational speed Ne can be avoided from passing through the resonance speed range so that the resonance can be avoided from being generated in the process of reduction of the engine rotational speed Ne. Step ST7 is followed by step ST8 corresponding to control function of the engine-stop control portion 74, which is implemented to determine whether the vehicle 10 is running or not. When a negative determination is made at step ST8, one cycle of execution of the control routine is terminated. When an affirmative determination is made at step ST8, step ST9 corresponding to control function of the engine-stop control portion 74 is implemented to engage the second clutch WSC. After step ST9 has been implemented, one cycle of execution of the control routine is terminated.

Figure 3:
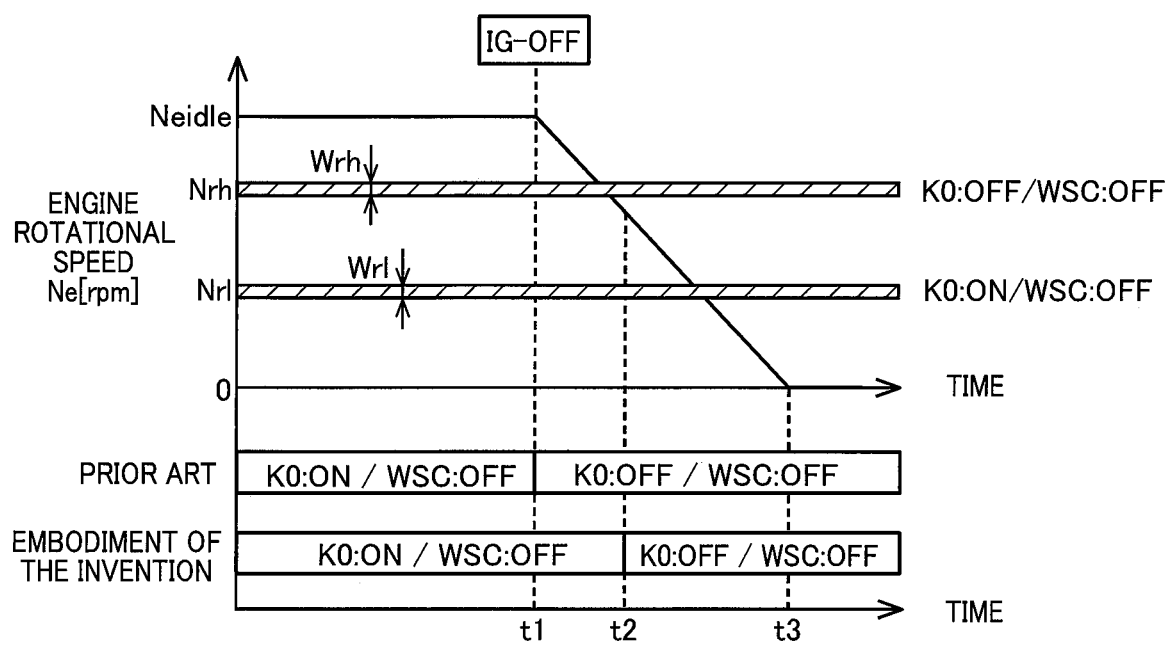
FIG. 3 is a time chart for explaining execution of the engine-stop control operation during stop of the vehicle.

FIG. 3 is a time chart for explaining the engine-stop control operation executed during stop of the vehicle 10. An upper part of the time chart shows change of the engine rotational speed Ne, while a lower part of the time chart shows operation states of the first clutch K0 and the second clutch WSC. In the lower part of the time chart, "ON" represents engagement of the first clutch K0 or the second clutch WSC, while "OFF" represents release of the first clutch K0 or the second clutch WSC. In an example shown in the time chart of FIG. 3, in a stage until a time point t1, the vehicle 10 is in its stopped state, so that the second clutch WSC is released (WSC: OFF). Further, in this stage until the time point t1, the engine 14 is rotated at an idle speed Neidle with the first clutch K0 being engaged.

In FIG. 3, at the time point t1, the engine-stop command signal (IG-OFF) is outputted for stopping the engine 14, whereby the fuel cut to the engine 14 is started and the reduction of the engine rotational speed Ne is started. In a stage from the time point t1 to a time point t3 at which the engine rotational speed Ne becomes zero, the engine rotational speed Ne is reduced at a predetermined rate that is substantially constant.

As shown in FIG. 3, in prior art, the first clutch K0 is released at the time point t1. However, in the present embodiment of the invention, the first clutch K0 is kept engaged even after the time point t1 so that the resonance speed range of the engine rotational speed Ne is kept to be the second resonance speed range Wrl. Therefore, the resonance is not generated in a stage in which the engine rotational speed Ne passes through the first resonance speed range Wrh. Then, at a time point t2 after the engine rotational speed Ne has passed through the first resonance speed range Wrh, the first clutch K0 is released. In this instance, the engine rotational speed Ne at the time point t2 at which the first clutch K0 is switched from the engaged state to the released state, is still higher than the second resonance speed range Wrl. With the first clutch K0 being switched from the engaged state to the released state before the engine rotational speed Ne reaches the second resonance speed range Wrl, the resonance speed range of the engine rotational speed Ne is switched from the second resonance speed range Wrl to the first resonance speed range Wrh before the engine rotational speed Ne reaches the second resonance speed range Wrl, so that the resonance is not generated in a stage in which the engine rotational speed Ne passes through the second resonance speed range Wrl. On the other hand, in the prior art, the first clutch K0 is switched from the engaged state to the released state at the time point t1 at which the engine-stop command signal is outputted, so that the resonance is inevitably generated in the stage in which the engine rotational speed Ne passes through the first resonance speed range Wrh.

Figure 4:
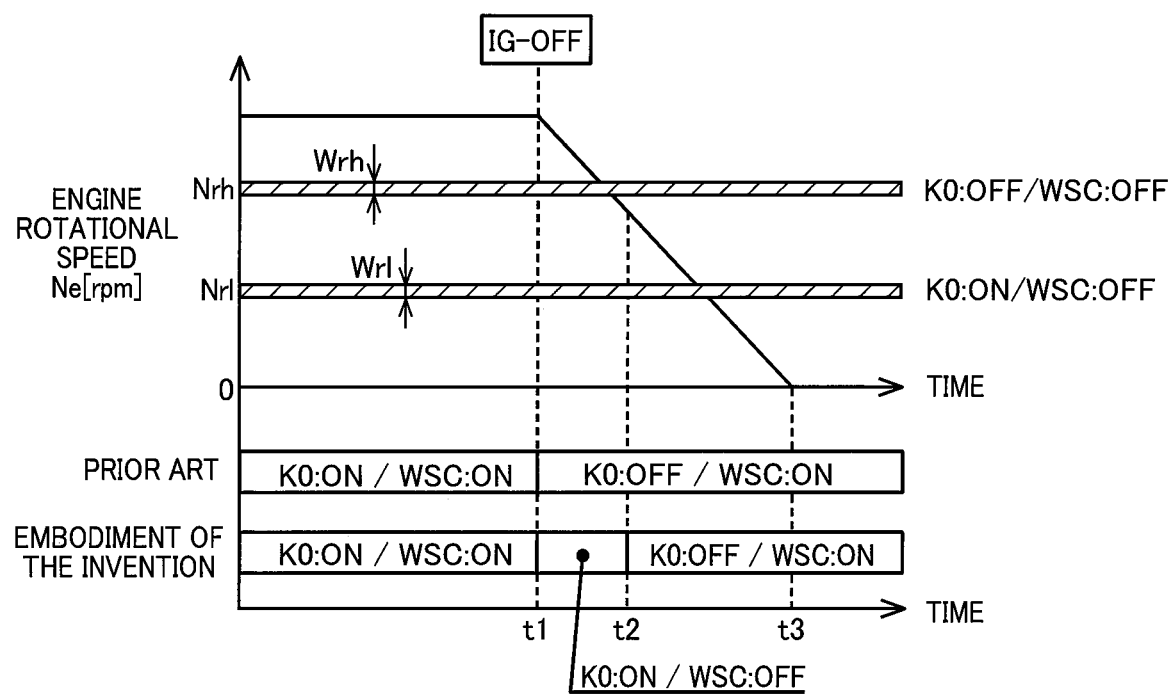
FIG. 4 is a time chart for explaining execution of the engine-stop control operation during running of the vehicle.

FIG. 4 is a time chart for explaining the engine-stop control operation executed during running of the vehicle 10. An upper part of the time chart shows change of the engine rotational speed Ne, while a lower part of the time chart shows operation states of the first clutch K0 and the second clutch WSC. In the lower part of the time chart, "ON" represents engagement of the first clutch K0 or the second clutch WSC, while "OFF" represents release of the first clutch K0 or the second clutch WSC. In an example shown in the time chart of FIG. 4, in a stage until a time point t1, the vehicle 10 is in its running state, so that the first clutch K0 is engaged (K0:ON) and the second clutch WSC is engaged (WSC:ON). Further, in this stage until the time point t1, the engine 14 is rotated at a speed that is dependent on the running speed V and the gear ratio γ of the automatic transmission 20.

In FIG. 4, at the time point t1, during the running of the vehicle 10, the engine-stop command signal (IG-OFF) is outputted for stopping the engine 14, whereby the second clutch WSC is switched from the engaged state to the released state, so as to cut off the drive-force transmission path between the engine 14 and the drive wheels 36. Then, the fuel cut to the engine 14 is started and the reduction of the engine rotational speed Ne is started. In a stage from the time point t1 to a time point t3 at which the engine rotational speed Ne becomes zero, the engine rotational speed Ne is reduced at a predetermined rate that is substantially constant.

As shown in FIG. 4, in prior art, the first clutch K0 is released at the time point t1. However, in the present embodiment of the invention, the first clutch K0 is kept engaged even after the time point t1 so that the resonance speed range of the engine rotational speed Ne is kept to be the second resonance speed range Wrl. Therefore, the resonance is not generated in a stage in which the engine rotational speed Ne passes through the first resonance speed range Wrh. Then, at a time point t2 after the engine rotational speed Ne has passed through the first resonance speed range Wrh, the first clutch K0 is released. Further, at the time point t2, when it is determined that the vehicle 10 is running, the second clutch WSC is engaged. With the first clutch K0 being switched from the engaged state to the released state at the time point t2, the resonance speed range of the engine rotational speed Ne is switched from the second resonance speed range Wrl to the first resonance speed range Wrh before the engine rotational speed Ne reaches the second resonance speed range Wrl, so that the resonance is not generated in a stage in which the engine rotational speed Ne passes through the second resonance speed range Wrl. On the other hand, in the prior art, the first clutch K0 is switched from the engaged state to the released state at the time point t1 at which the engine-stop command signal is outputted, so that the resonance is inevitably generated in the stage in which the engine rotational speed Ne passes through the first resonance speed range Wrh.

There will be next described a control operation executed when the engine 14 is to be started. When an engine-start command signal is outputted to start the engine 14 that in a stopped state, the engine-start control portion 76 executes an engine-start control operation for starting the engine 14. The engine-start command signal is outputted, for example, (i) when an engine start operation is made by the vehicle driver to start the engine 14 during stop of the vehicle 10, (ii) when the vehicle 10 running in the EV running mode enters into an operation region in which the HV running mode is to be established, (iii) when the vehicle 10 needs to be warmed up and (iv) when the charged state value SOC of the electric storage device 32 has reached a predetermined lower limit threshold.

When it is determined that the engine 14 is to be started and the engine-start command signal is outputted, the engine-start control portion 76 controls the starter motor 40 provided in the engine 14, so as to increase the engine rotational speed N, and ignites the engine 14 when the engine rotational speed N is increased to an ignitable rotational speed (at which the engine 14 is ignitable). In a process of the increase of the engine rotational speed Ne, the resonance is generated in a stage in which the engine rotational speed Ne passes through the resonance speed range corresponding to the resonance frequency of the flywheel damper 18. However, the engine-start control portion 76 executes a control operation as described below in the process of the increase of the engine rotational speed Ne, for avoiding the resonance that is to be generated when the engine rotational speed Ne passes through the resonance speed range.

As described above, the resonance speed range of the engine rotational speed Ne varies depending on the operation state of the first clutch K0, namely, depending on whether the first clutch K0 is placed in its engaged state or its released state, so that the first resonance speed range Wrh in which the resonance is to be generated with the first clutch K0 being released and the second resonance speed range Wrl in which the resonance is to be generated with the first clutch K0 being engaged are different from each other, and the first resonance speed range Wrh is higher than the second resonance speed range Wrl.

When the engine 14 is to be started, the engine-start control portion 76 avoids generation of the resonance in the process of increase of the engine rotational speed Ne, by causing the first clutch K0 to be released at an appropriate timing so as to avoid the engine rotational speed Ne from passing through the resonance speed range. When the engine-start command signal is outputted, the engine-start control portion 76 controls the starter motor 40 such that the engine rotational speed Ne is increased at a predetermined rate. The first clutch K0 is placed in the released state at a point of time at which the engine-start command signal is outputted, because the first clutch K0 is placed in the released state during stop of the engine 12, for avoiding dragging of the engine 14. The engine-start control portion 76 keeps the first clutch K0 released even after start of the increase of the engine rotational speed Ne. In this instance, the resonance speed range of the engine rotational speed Ne is the first resonance speed range Wrh in which the resonance is to be generated with the first clutch K0 being released. Therefore, the resonance is not generated in the stage in which the engine rotational speed Ne passes through the second resonance speed range Wrl.

Then, the engine-start control portion 76 determines whether the engine rotational speed Ne has passed through the second resonance speed range Wrl in which the resonance is to be generated with the first clutch K0 being engaged. Specifically described, the engine-start control portion 76 determines whether the engine rotational speed Ne has becomes higher than a second determination value X2(=Nrl+B) that is obtained by adding a second predetermined value B to a clutch-engagement resonance rotational speed Nrl that is a representative value within the second resonance speed range Wrl in which the resonance is to be generated with the first clutch K0 being engaged.

The clutch-engagement resonance rotational speed Nrl as the representative value within the second resonance speed range Wrl1 is set to a speed value of the engine rotational speed Ne at which an amplitude of the resonance is maximized within the second resonance speed range Wrl in which the amplitude of the resonance is not smaller than a predetermined amplitude value. The second predetermined value B is set to a value such that the second determination value X2(=Nrl+B), which is obtained by adding the second predetermined value B to the clutch-engagement resonance rotational speed Nrl, is not lower than an upper limit of the second resonance speed range Wrl in which the amplitude of the resonance is not smaller than the predetermined amplitude value. Further, the second predetermined value B is set to the value, by taking account of also variations of components, such that the second determination value X2 is reliably deviated from the second resonance speed range Wrl.

It is determined that the engine rotational speed Ne has not yet passed through the second resonance speed range Wrl in which the resonance is to be generated with the first clutch K0 being engaged, as long as the engine rotational speed Ne is not higher than the second determination value X2. As long as it is determined that the engine rotational speed Ne has not yet passed through the second resonance speed range Wrl, the engine-stop control portion 74 keeps the first clutch K0 released.

When the engine rotational speed Ne has become higher than the second determination value X2, it is determined that the engine rotational speed Ne has passed through the second resonance speed range Wrl. In a stage in which the engine rotational speed Ne passes through the second resonance speed range Wrl, the first clutch K0 is released whereby the resonance speed range of the engine rotational speed Ne is the first resonance speed range Wrh, so that the resonance is not generated. When the engine rotational speed Ne has become higher than the second determination value X2, namely when determining that the engine rotational speed Ne has passed through the second resonance speed range Wrl, the engine-start control portion 76 determines whether the vehicle 10 is running or not.

There will be first described execution of the engine-start control operation when the vehicle 10 is stopped. When determining that the vehicle 10 is stopped, the engine-start control portion 76 causes the first clutch K0 to be engaged. With the first clutch K0 being engaged, the resonance speed range of the engine rotational speed Ne becomes the second resonance speed range Wrl in which the resonance is to be generated with the first clutch K0 being engaged. Since the engine rotational speed Ne is increased to be deviated from the second resonance speed range Wrl in a state in which the first clutch K0 is engaged, namely, in which the resonance speed range of the engine rotational speed Ne is the second resonance speed range Wrl, the resonance is not generated in a stage in which the engine rotational speed Ne passes through the first resonance speed range Wrh. Thus, in the process of increase of the engine rotational speed Ne during execution of the engine-start control operation, the engine rotational speed Ne is avoided from passing through the resonance speed range.

The engine-start control portion 76 causes the first clutch K0 to be engaged in a stage after the engine rotational speed Ne has passed through the second resonance speed range Wrl (in which the resonance is to be generated with the first clutch K0 being engaged) and before the engine rotational speed Ne enters or reaches the first resonance speed range Wrh (in which the resonance is to be generated with the first clutch K0 being released). As a result of engagement of the first clutch K0, the resonance speed range of the engine rotational speed Ne is switched from the first resonance speed range Wrh to the second resonance speed range Wrl before the engine rotational speed Ne reaches the first resonance speed range Wrh. Consequently, the resonance is not generated in a stage in which the engine rotational speed Ne passes through the first resonance speed range Wrh.

There will be next described execution of the engine-start control operation when the vehicle 10 is running. When determining that the vehicle 10 is running at a point of time at which the engine rotational speed Ne has passed through the second resonance speed range Wrl, the engine-start control portion 76 releases the second clutch WSC so as to temporarily cut off the drive-force transmission path between the engine 14 and the drive wheels 36. Then, the engine-start control portion 76 engages the first clutch K0, and then determines whether the engine rotational speed Ne has reached a speed that is dependent on the running speed V and the gear ratio γ established in the automatic transmission 20, after engagement of the first clutch K0. In this instance, the engine-start control portion 76 keeps the second clutch WSC released until the engine rotational speed Ne has reached the speed dependent on the running speed V and the gear ratio γ established in the automatic transmission 20. When the engine rotational speed Ne has reached the speed dependent on the running speed V and the gear ratio γ established in the automatic transmission 20, the engine-start control portion 76 engages the second clutch WSC so as to keep the vehicle 10 to run.

Figure 5:
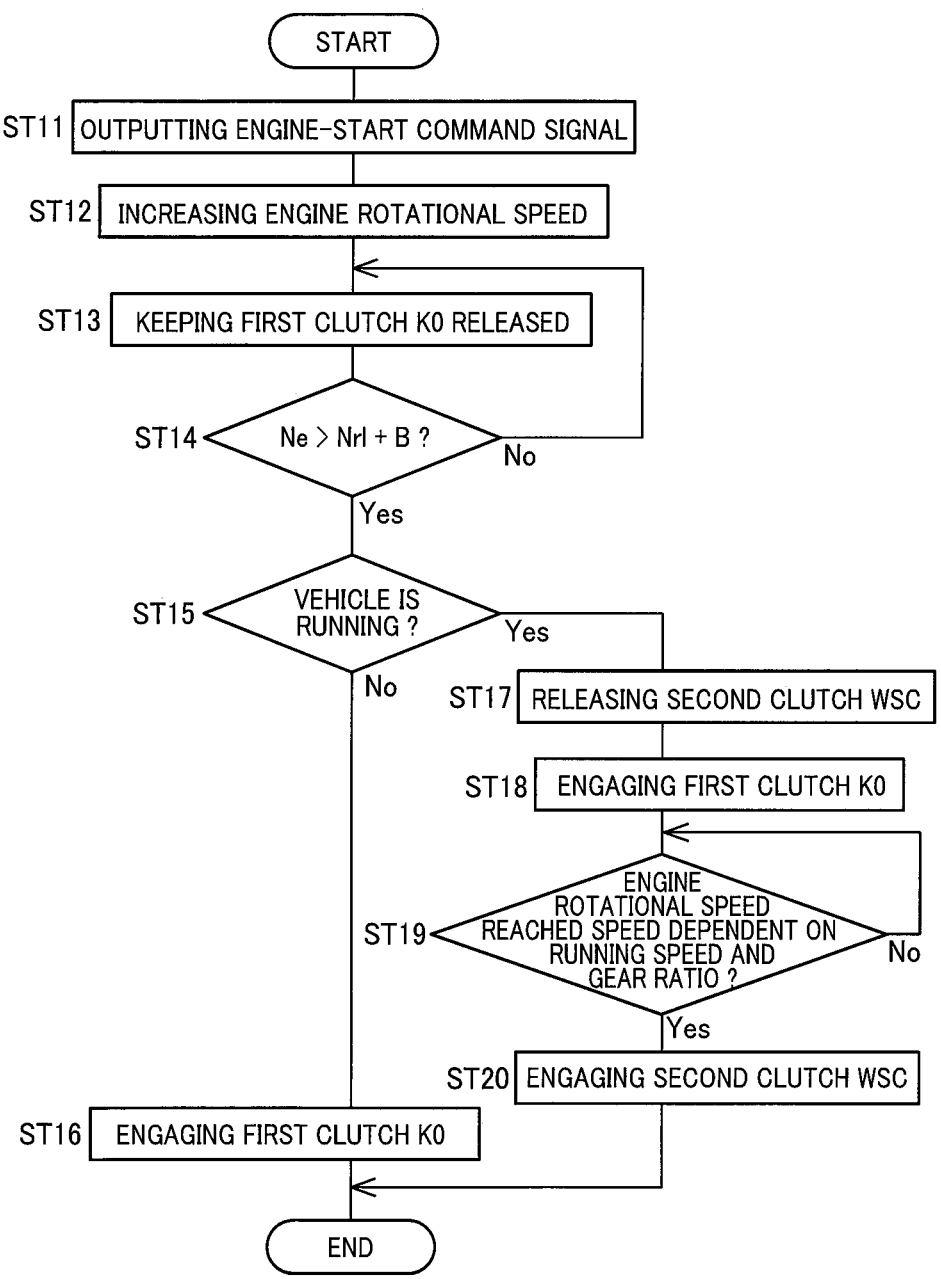
FIG. 5 is a flow chart showing a main part of a control routine executed by the electronic control apparatus shown in FIG. 1, namely, a control routine that is executed for avoiding the resonance that could be generated in execution of an engine-start control operation.

FIG. 5 is a flow chart showing a main part of a control routine executed by the electronic control apparatus 50, namely, a control routine that is executed for avoiding the resonance that could be generated when the engine 14 is to be started. This control routine is executed each time it is determined that the engine 14 is to be started either during stop of the vehicle 10 or during running of the vehicle 10. It is noted that, in an example of the control routine shown in the flow char of FIG. 5, the first clutch K0 is placed in the released state at a point of time at which it is determined that the engine 14 is to be started.

The control routine is initiated with step ST11 corresponding to control function of the engine-start control portion 76, which is implemented to output the engine-start command signal. Step ST11 is followed by step ST12 corresponding to control function of the engine-start control portion 76, which is implemented to increase the engine rotational speed Ne by the starter motor 40. Then, at step ST13 corresponding to control function of the engine-start control portion 76, the first clutch K0 is kept released. Step ST13 is followed by step ST14 corresponding to control function of the engine-start control portion 76, which is implemented to determine whether the engine rotational speed Ne has become higher than the second determination value X2(=Nrl+B) or not. When a negative determination is made at step ST14, the control flow goes back to step ST13. When an affirmative determination is made at step ST14, step ST15 corresponding to control function of the engine-start control portion 76 is implemented to determine whether the vehicle 10 is running or not. When a negative determination is made at step ST15, step ST16 corresponding to control function of the engine-start control portion 76 is implemented to engage the first clutch K0. After step ST16 has been implemented, one cycle of execution of the control routine is terminated. At step ST16, the first clutch K0 is switched from the released state to the engaged state before the engine rotational speed Ne enters or reaches the first resonance speed range Wrh in which the resonance is to be generated with the first clutch K0 being released. With the engine-stop control operation being executed as described above, the engine rotational speed Ne can be avoided from passing through the resonance speed range so that the resonance can be avoided from being generated in the process of increase of the engine rotational speed Ne.

When an affirmative determination is made at step ST15, the control flow goes to step ST17 corresponding to control function of the engine-start control portion 76, which is implemented to release the second clutch WSC. Then, step ST18 corresponding to control function of the engine-start control portion 76 is implemented to engage the first clutch K0, and step ST19 corresponding to control function of the engine-start control portion 76 is implemented to determine whether the engine rotational speed Ne has reached a speed dependent on the running speed V and the gear ratio γ or not. When a negative determination is made at step ST19, step ST19 is repeatedly implemented until an affirmative determination is made at step ST19. When an affirmative determination is made at step ST19, step ST20 corresponding to control function of the engine-start control portion 76 is implemented to engage the second clutch WSC. After step ST20 has been implemented, one cycle of execution of the control routine is terminated.

Figure 6:
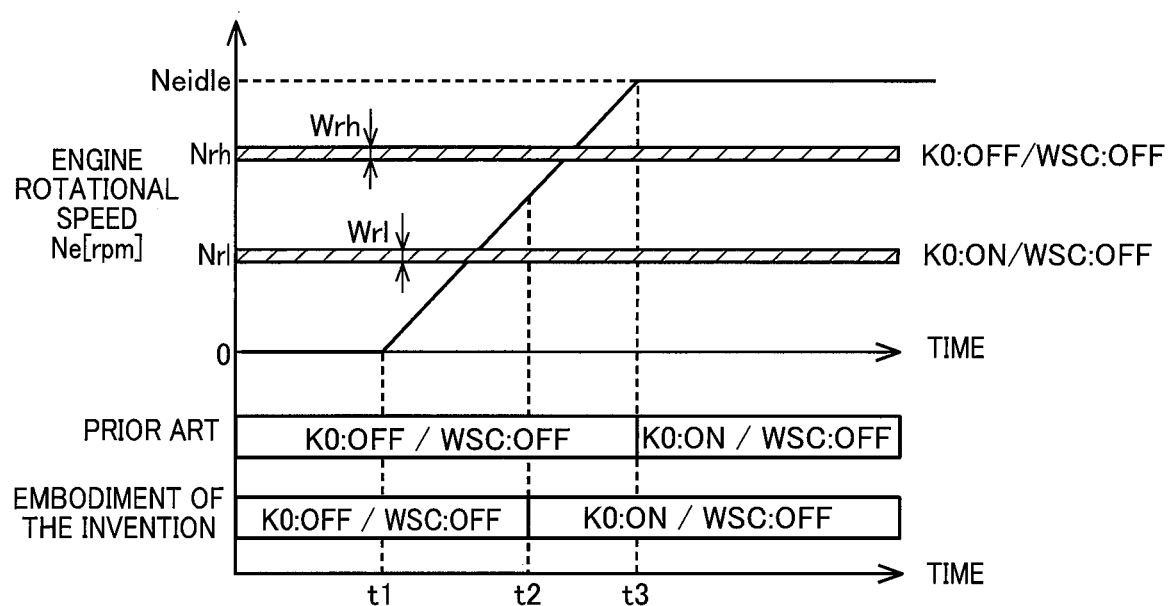
FIG. 6 is a time chart for explaining execution of the engine-start control operation during stop of the vehicle.

There will be next described the engine-start control operation during stop of the vehicle. FIG. 6 is a time chart for explaining execution of the engine-start control operation during the stop of the vehicle. An upper part of the time chart shows change of the engine rotational speed Ne, while a lower part of the time chart shows operation states of the first clutch K0 and the second clutch WSC. In the lower part of the time chart, "ON" represents engagement of the first clutch K0 or the second clutch WSC, while "OFF" represents release of the first clutch K0 or the second clutch WSC. In an example shown in the time chart of FIG. 6, in a stage until a time point t1, the first clutch K0 and the second clutch WSC are both released.

In FIG. 6, at the time point t1, the engine-start command signal is outputted for starting the engine 14, whereby the engine rotational speed Ne is increased by the starter motor 40 at a predetermined rate that is substantially constant. Further, at the time point t1, the first clutch K0 is released, and the first clutch K0 is kept released even after the time point t1. As long as the first clutch K0 is placed in the released state, the resonance speed range of the engine rotational speed Ne is the first resonance speed range Wrh, so that the resonance is not generated in a stage in which the engine rotational speed Ne passes through the second resonance speed range Wrl. Further, in the present embodiment, the first clutch K0 is switched from the released state to the engaged state at a time point t2 after the engine rotational speed Ne has passed through the second resonance speed range Wrl. At the time point t2, the engine rotational speed Ne is still lower than the first resonance speed range Wrh. Before the engine rotational speed Ne reaches the first resonance speed range Wrh, the first clutch K0 is switched from the released state to the engaged state whereby the resonance speed range of the engine rotational speed Ne is switched from the first resonance speed range Wrh to the second resonance speed range Wrl, so that the resonance is not generated in a stage in which the engine rotational speed Ne passes through the first resonance speed range Wrh. On the other hand, in prior art, the first clutch K0 is kept released from the time point t1 (at which the engine-start command signal is outputted) until the engine rotational speed Ne reaches the idle speed Neidle, so that the resonance is inevitably generated in the stage in which the engine rotational speed Ne passes through the first resonance speed range Wrh. It is noted that, in a case in which the ignitable rotational speed (at which the engine 14 is ignitable) is lower than the idle speed Neidle, the engine 14 is ignited in a stage in which the engine rotational speed Ne is increased to the idle speed Neidle.

Figure 7:
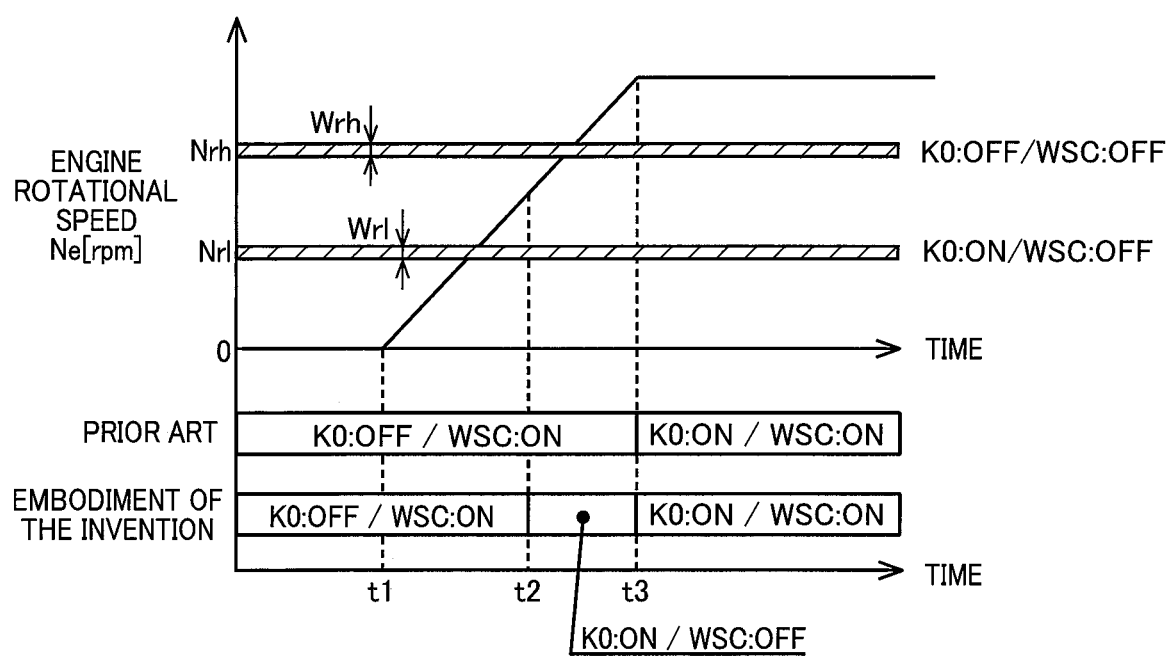
FIG. 7 is a time chart for explaining execution of the engine-start control operation during running of the vehicle.

There will be next described the engine-start control operation during running of the vehicle. FIG. 7 is a time chart for explaining execution of the engine-start control operation during the running of the vehicle. An upper part of the time chart shows change of the engine rotational speed Ne, while a lower part of the time chart shows operation states of the first clutch K0 and the second clutch WSC. In the lower part of the time chart, "ON" represents engagement of the first clutch K0 or the second clutch WSC, while "OFF" represents release of the first clutch K0 or the second clutch WSC. In an example shown in the time chart of FIG. 7, in a stage until a time point t1, the first clutch K0 is released while the second clutch WSC is engaged.

In FIG. 7, at the time point t1, the engine-start command signal is outputted for starting the engine 14, whereby the engine rotational speed Ne is increased by the starter motor 40 at a predetermined rate that is substantially constant. Further, at the time point t1, the first clutch K0 is released, and the first clutch K0 is kept released even after the time point t1. As long as the first clutch K0 is placed in the released state, the resonance speed range of the engine rotational speed Ne is the first resonance speed range Wrh, so that the resonance is not generated in a stage in which the engine rotational speed Ne passes through the second resonance speed range Wrl. Further, in the present embodiment, the second clutch WSC is switched from the engaged state to the released state and the first clutch K0 is switched from the released state to the engaged state at a time point t2 after the engine rotational speed Ne has passed through the second resonance speed range Wrl. Therefore, the resonance is not generated in a stage in which the engine rotational speed Ne passes through the first resonance speed range Wrh. At a point time t3 at which the engine rotational speed Ne has reached the speed dependent on the running speed V and the gear ratio γ established in the automatic transmission 20, the second clutch WSC is engaged. On the other hand, in prior art, the first clutch K0 is not switched from the released state to the engaged state until the time point t3, so that the resonance is inevitably generated in the stage in which the engine rotational speed Ne passes through the first resonance speed range Wrh.

As described above, in the above-described embodiment, in the process of reduction of the engine rotational speed Ne when the engine 14 is to be stopped, the first clutch K0 is kept engaged in the stage until the engine rotational speed Ne has passed through the first resonance speed range Wrh, namely, in the stage until the engine rotational speed Ne becomes lower than the first resonance speed range Wrh, whereby generation of the resonance is avoided when the engine rotational speed Ne passes through the first resonance speed range Wrh. Further, the first clutch K0 is caused to be released, after the engine rotational speed Ne has passed through the first resonance speed range Wrh before entering or reaching the second resonance speed range Wrl, whereby generation of the resonance is avoided when the engine rotational speed Ne passes through the second resonance speed range Wrl. Thus, by causing the first clutch K0 to be released at an appropriate timing in the process of reduction of the engine rotational speed Ne when the engine 14 is to be stopped, it is possible to advantageously avoid generation of the resonance in the engine stop process of the engine 14.

In the above-described embodiment, in the process of increase of the engine rotational speed Ne when the engine 14 is to be started, the first clutch K0 is kept released in the stage until the engine rotational speed Ne has passed through the second resonance speed range Wrl, namely, in the stage until the engine rotational speed Ne becomes higher than the second resonance speed range Wrl, whereby generation of the resonance is avoided when the engine rotational speed Ne passes through the second resonance speed range Wrl. Further, the first clutch K0 is caused to be engaged, after the engine rotational speed Ne has passed through the second resonance speed range Wrl before entering or reaching the first resonance speed range Wrh, whereby generation of the resonance is avoided when the engine rotational speed Ne passes through the first resonance speed range Wrh. Thus, by causing the first clutch K0 to be engaged at an appropriate timing in the process of increase of the engine rotational speed Ne when the engine 14 is to be started, it is possible to advantageously avoid generation of the resonance in an engine start process of the engine 14.

In the above-described embodiment, the fuel cut is executed to the engine 14 and the engine rotational speed Ne is reduced by the execution of the fuel cut, it is difficult to reduce a length of time for which the engine rotational speed Ne is within the resonance speed range, by causing the engine rotational speed Ne to be quickly reduced. However, by causing the first clutch K0 to be released at an appropriate timing in the process of reduction of the engine rotational speed Ne, it is possible to advantageously avoid the resonance which could be generated if the engine rotational speed Ne passes through the resonance speed range in the process of the reduction of the engine rotational speed Ne. Further, the at least one inertial body includes the rotor 64 of the electric motor MG, so that an inertial mass of the at least one inertial body is increased. By the increase of the inertial mass, a deviation amount between the first and second resonance speed ranges Wrh, Wrl is increased whereby a length of time required by change of the engine rotational speed Ne between the first and second resonance speed ranges Wrh, Wrl is increased. Therefore, it is possible to increase a length of time within which the first clutch K0 is to be released or engaged.

There will be described other embodiments of this invention. The same reference signs as used in the above-described first embodiment will be used in the following embodiments, to identify the functionally corresponding elements, and descriptions thereof are not provided.

Second Embodiment

Figure 8:
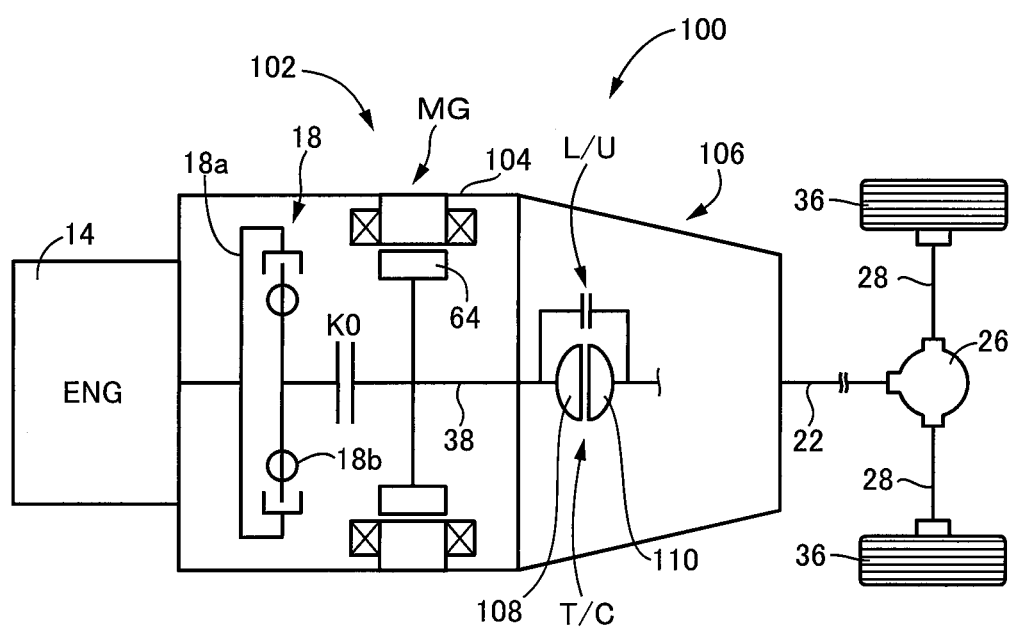
FIG. 8 is a view schematically showing a construction of a vehicle according to another embodiment of the present invention.

FIG. 8 is a view schematically showing a construction of a vehicle 100 according to this second embodiment of the present invention. As shown in FIG. 8, the vehicle 100 is a hybrid vehicle including the engine 14 and the electric motor MG as the drive force sources for enabling the vehicle 100 to run. The vehicle 100 is different from the vehicle 10 in the above-described first embodiment in that the vehicle 100 is not provided with the second clutch WSC that is provided in the vehicle 10 in the first embodiment.

The vehicle 100 includes a drive-force transmitting apparatus 102 provided between the engine 14 and the drive wheels 36. The drive-force transmitting apparatus 102 includes a transmission case 104 as a non-rotary member, such that the flywheel damper 18, the first clutch K0, the electric motor MG and an automatic transmission 106 are arranged in this order of description in a direction away from the engine 14 and are disposed inside the transmission case 104. The drive-force transmitting apparatus 102 further includes the differential gear 26 and the pair of right and left axles 28. The differential gear 26 is connected to the output shaft 22 that is the output rotary member of the automatic transmission 106. The axles 28 are connected to the differential gear 26. It is noted that FIG. 8 does not show an inerter configured to control operation of the electric motor MG, an electric storage device configured to supply and receive an electric power to and from the electric motor MG through the inverter, and a hydraulic control unit configured to control shifting actions of the automatic transmission 106 and engaging/releasing actions of the first clutch K0.

The automatic transmission 106 includes a torque converter T/C that is connected to the input shaft 38 in a drive-force transmittable manner. The torque converter T/C is a well-known fluid transmission device configured to transmit the drive force through a fluid, and includes a lockup clutch L/U configured to connect and disconnect between a pump impeller 108 and a turbine impeller 110 that are included in the torque converter T/C.

The present invention is applicable also to the vehicle 100 constructed as described above. Specifically, as in the above-described embodiment, it is possible to avoid generation of the resonance, by causing the first clutch K0 to be released at an appropriate timing in the engine stop process and causing the first clutch K0 to be engaged at an appropriate timing in the engine start process such that the engine rotational speed Ne is avoided from passing through the resonance speed range.

As is apparent from FIG. 8, in a state in which the lockup clutch L/U is released, when the first clutch K0 is engaged, the inertial bodies including the rotor 64 of the electric motor MG and the pump impeller 108 of the torque converter T/C are connected to the flywheel damper 18, so as to constitute a drive-force transmission path from the first clutch K0 to the torque converter T/C. Therefore, the second resonance speed range Wrl in which the resonance is to be generated with the first clutch K0 being engaged is lower than the first resonance speed range Wrh in which the resonance is to be generated with the first clutch K0 being released. Therefore, when the engine 10 is to be stopped in the engine stop process, it is possible to avoid the engine rotational speed Ne from passing through the resonance speed range, by reducing the engine rotational speed Ne in a state in which the first clutch K0 is engaged and then releasing the first clutch K0 after the engine rotational speed Ne has passed through the first resonance speed range Wrh. Further, when the engine 10 is to be started in the engine start process, it is possible to avoid the engine rotational speed Ne from passing through the resonance speed range, by increasing the engine rotational speed Ne in a state in which the first clutch K0 is released and then engaging the first clutch K0 after the engine rotational speed Ne has passed through the second resonance speed range Wrl. It is noted that specific details of the engine-stop control operation and the engine-start control operation are substantially the same as those in the above-described first embodiment and accordingly the descriptions are not provided.

Figure 9:
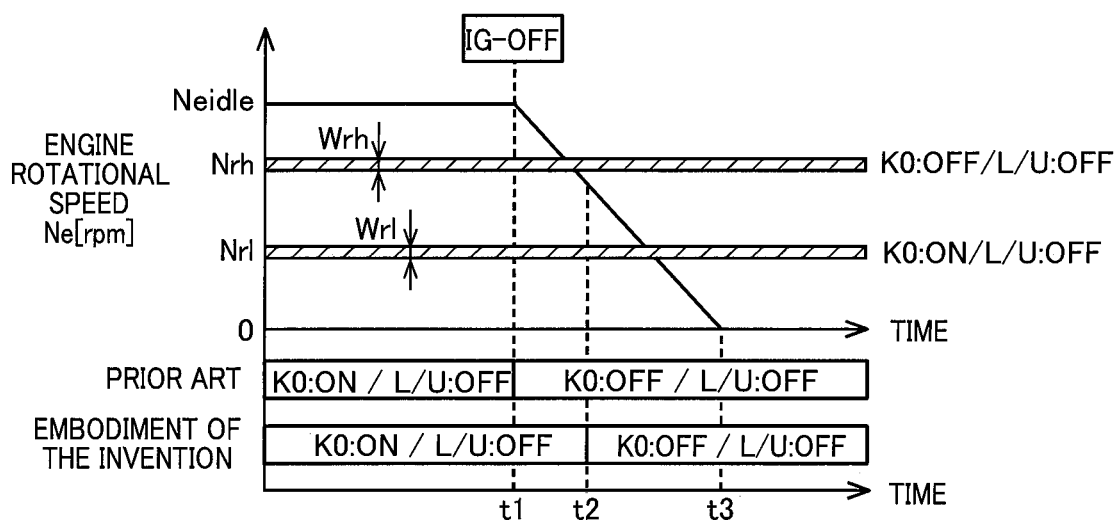
FIG. 9 is a time chart for explaining execution of the engine-stop control operation during stop of the vehicle of FIG. 8.

FIG. 9 is a time chart for explaining execution of the engine-stop control operation during stop of the vehicle 100 of FIG. 8. An upper part of the time chart shows change of the engine rotational speed Ne, while a lower part of the time chart shows operation states of the first clutch K0 and the lockup clutch L/U. In the lower part of the time chart, "ON" represents engagement of the first clutch K0 or the lockup clutch L/U, while "OFF" represents release of the first clutch K0 or the lockup clutch L/U. In an example shown in the time chart of FIG. 9, in a stage until a time point t1, the vehicle 10 is in its stopped state, so that the lockup clutch L/U is released while the first clutch K0 is engaged. Further, in this stage until the time point t1, the engine 14 is rotated at the idle speed Neidle with the first clutch K0 being engaged.

In FIG. 9, at the time point t1, the engine-stop command signal (IG-OFF) is outputted for stopping the engine 14, whereby the fuel cut to the engine 14 is started and the reduction of the engine rotational speed Ne is started. In a stage from the time point t1 to a time point t3 at which the engine rotational speed Ne becomes zero, the engine rotational speed Ne is reduced at a predetermined rate that is substantially constant.

As shown in FIG. 9, in prior art, the first clutch K0 is released at the time point t1. However, in the present embodiment of the invention, the first clutch K0 is kept engaged even after the time point t1 so that the resonance speed range of the engine rotational speed Ne is kept to be the second resonance speed range Wrl. Therefore, the resonance is not generated in a stage in which the engine rotational speed Ne passes through the first resonance speed range Wrh. Then, at a time point t2 after the engine rotational speed Ne has passed through the first resonance speed range Wrh, the first clutch K0 is released. In this instance, the engine rotational speed Ne at the time point t2 at which the first clutch K0 is switched from the engaged state to the released state, is still higher than the second resonance speed range Wrl. With the first clutch K0 being switched from the engaged state to the released state before the engine rotational speed Ne reaches the second resonance speed range Wrl, the resonance speed range of the engine rotational speed Ne is switched from the second resonance speed range Wrl to the first resonance speed range Wrh before the engine rotational speed Ne reaches the second resonance speed range Wrl, so that the resonance is not generated in a stage in which the engine rotational speed Ne passes through the second resonance speed range Wrl. On the other hand, in the prior art, the first clutch K0 is switched from the engaged state to the released state at the time point t1 at which the engine-stop command signal is outputted, so that the resonance is inevitably generated in the stage in which the engine rotational speed Ne passes through the first resonance speed range Wrh.

Figure 10:
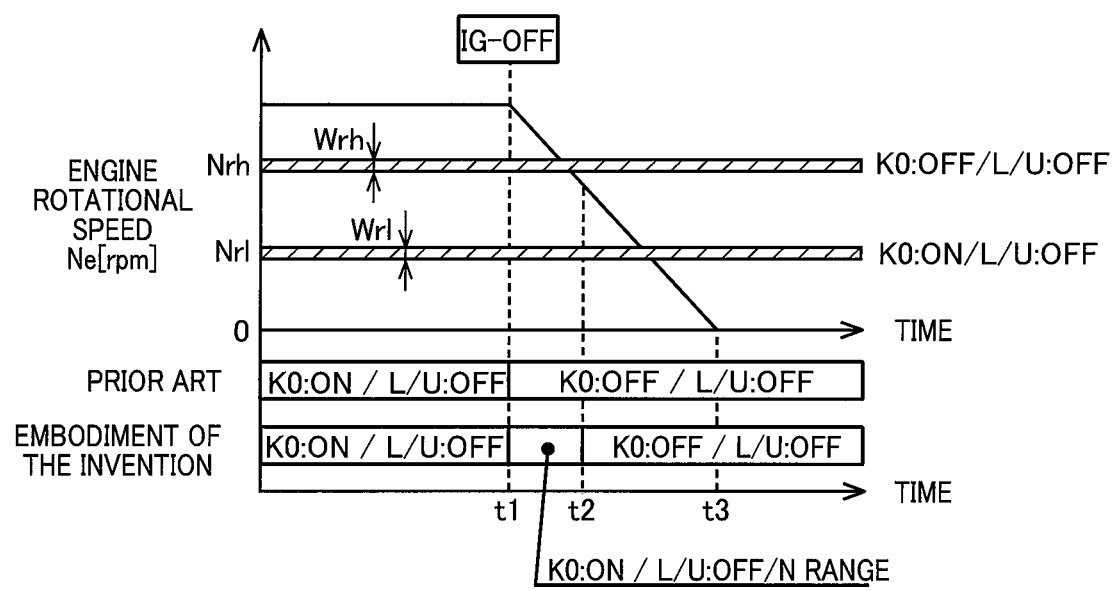
FIG. 10 is a time chart for explaining execution of the engine-stop control operation during running of the vehicle of FIG. 8.

FIG. 10 is a time chart for explaining the engine-stop control operation executed during running of the vehicle 100 of FIG. 8. An upper part of the time chart shows change of the engine rotational speed Ne, while a lower part of the time chart shows operation states of the first clutch K0 and the lockup clutch L/U. In the lower part of the time chart, "ON" represents engagement of the first clutch K0 or the lockup clutch L/U, while "OFF" represents release of the first clutch K0 or the lockup clutch L/U. In an example shown in the time chart of FIG. 10, in a stage until a time point t1, the vehicle 100 is in its running state, so that the first clutch K0 is engaged and the lockup clutch L/U is released. Further, in this stage until the time point t1, the engine 14 is rotated at a speed that is dependent on the running speed V and the gear ratio γ of the automatic transmission 106.

In FIG. 10, at the time point t1, the engine-stop command signal is outputted for stopping the engine 14, whereby the automatic transmission 106 is placed into a neutral range (N range), so as to be placed in a drive-force-transmission cut-off state. Then, the fuel cut to the engine 14 is started and the reduction of the engine rotational speed Ne is started. In a stage from the time point t1 to a time point t3 at which the engine rotational speed Ne becomes zero, the engine rotational speed Ne is reduced at a predetermined rate that is substantially constant.

As shown in FIG. 10, in prior art, the first clutch K0 is released at the time point t1. However, in the present embodiment of the invention, the first clutch K0 is kept engaged even after the time point t1 so that the resonance speed range of the engine rotational speed Ne is kept to be the second resonance speed range Wrl. Therefore, the resonance is not generated in a stage in which the engine rotational speed Ne passes through the first resonance speed range Wrh. Then, at a time point t2 after the engine rotational speed Ne has passed through the first resonance speed range Wrh, the first clutch K0 is released. Further, at the time point t2, when it is determined that the vehicle 10 is running, the automatic transmission 106 is switched to a forward running range, namely, the automatic transmission 106 is switched to a drive-force transmission state. With the first clutch K0 being switched from the engaged state to the released state at the time point t2, the resonance speed range of the engine rotational speed Ne is switched from the second resonance speed range Wrl to the first resonance speed range Wrh before the engine rotational speed Ne reaches the second resonance speed range Wrl, so that the resonance is not generated in a stage in which the engine rotational speed Ne passes through the second resonance speed range Wrl. On the other hand, in the prior art, the first clutch K0 is switched from the engaged state to the released state at the time point t1 at which the engine-stop command signal is outputted, so that the resonance is inevitably generated in the stage in which the engine rotational speed Ne passes through the first resonance speed range Wrh.

As described above, in the vehicle 100 in this second embodiment, substantially the same control operations as in the above-described first embodiment are executed whereby substantially the same effects as in the first embodiment can be obtained.

Third Embodiment

Figure 11:
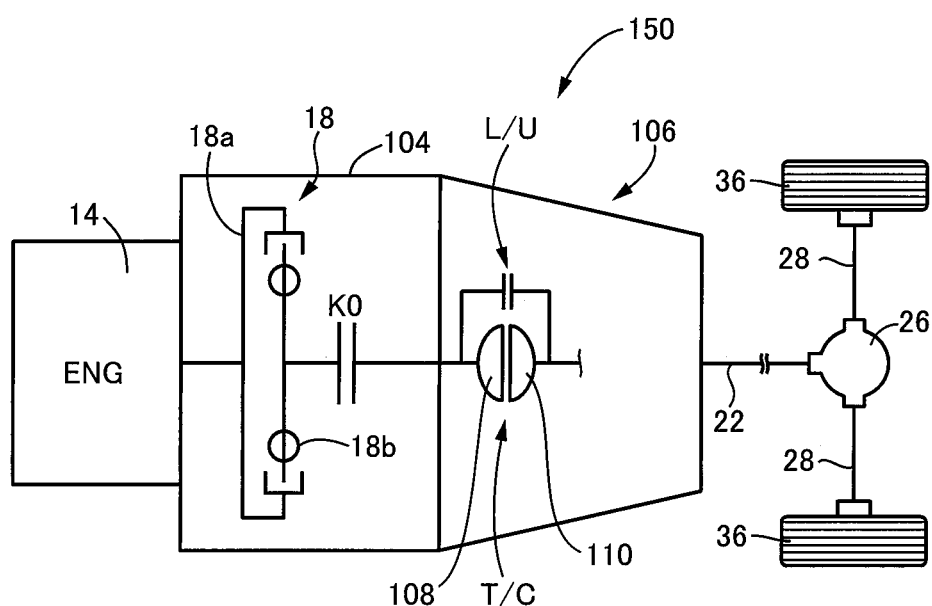
FIG. 11 is a view schematically showing a construction of a vehicle according to still another embodiment of the present invention.

FIG. 11 is a view schematically showing a construction of a vehicle 150 according to this third embodiment of the present invention. The vehicle 150 of FIG. 11 is different from the vehicle 100 of the above-described second embodiment in that the electric motor MG is not provided in the vehicle 150. That is, the vehicle 150 has only the engine 14 as the drive force source. Since the vehicle 150 has substantially the same construction as the vehicle 100 of the second embodiment except for the absence of the electric motor MG, description of the construction of the vehicle 150 is not provided.

The present invention is applicable also to the vehicle 150 of FIG. 11 that is not provided with the electric motor MG. Specifically, as in the above-described first and second embodiments, it is possible to avoid generation of the resonance, by causing the first clutch K0 to be released at an appropriate timing in the engine stop process and causing the first clutch K0 to be engaged at an appropriate timing in the engine start process such that the engine rotational speed Ne is avoided from passing through the resonance speed range.

As is apparent from FIG. 11, in a state in which the lockup clutch L/U is released, when the first clutch K0 is engaged, the at least one inertial body including the pump impeller 108 of the torque converter T/C is connected to the flywheel damper 18, so as to constitute the drive-force transmission path from the first clutch K0 to the torque converter T/C of the automatic transmission 106. Therefore, the second resonance speed range Wrl in which the resonance is to be generated with the first clutch K0 being engaged is lower than the first resonance speed range Wrh in which the resonance is to be generated with the first clutch K0 being released. Thus, the resonance speed range varies depending on the operation state of the first clutch K0. Therefore, when the engine 10 is to be stopped in the engine stop process, it is possible to avoid the engine rotational speed Ne from passing through the resonance speed range, by reducing the engine rotational speed Ne in a state in which the first clutch K0 is engaged and then releasing the first clutch K0 after the engine rotational speed Ne has passed through the first resonance speed range Wrh. Further, when the engine 10 is to be started in the engine start process, it is possible to avoid the engine rotational speed Ne from passing through the resonance speed range, by increasing the engine rotational speed Ne in a state in which the first clutch K0 is released and then engaging the first clutch K0 after the engine rotational speed Ne has passed through the second resonance speed range Wrl. It is noted that specific details of the engine-stop control operation and the engine-start control operation are substantially the same as those in the above-described embodiments and accordingly the descriptions are not provided.

As described above, the present invention is applicable also to the vehicle 150 of FIG. 11 that is not provided with the electric motor MG. That is, in the vehicle 150 in this third embodiment, substantially the same control operations as in the above-described first and second embodiments are executed whereby substantially the same effects as in the first and second embodiments can be obtained.

While the preferred embodiments of this invention have been described in detail by reference to the drawings, it is to be understood that the invention may be otherwise embodied.

For example, in the above-described first embodiment, the automatic transmission 20 is constituted by the known automatic transmission of planetary gear type. However, the type of the automatic transmission is not particularly limited. The automatic transmission 20 may be modified as needed without deviating from the sprit of the invention. For example, the automatic transmission 20 is constituted by a continuously-variable transmission of belt type.

Further, in the above-described embodiments, the first clutch K0 is in the engaged state at the point of time at which it is determined that the engine 14 is to be stopped. However, the present invention is applicable also to an arrangement in which the first clutch K0 is in the released state at the point of time at which it is determined that the engine 14 is to be stopped. In this arrangement, the above-described engine-stop control operation is executed, by switching the first clutch K0 from the released state to the engaged state immediately after it has been determined that the engine 14 is to be stopped.

Still further, in the above-described embodiments, the flywheel damper 18 is connected to the crank shaft 42 of the engine 14. However, the flywheel damper 18 may be provided integrally with the engine 14.

It is to be understood that the embodiments described above are given for illustrative purpose only, and that the present invention may be embodied with various modifications and improvements which may occur to those skilled in the art.

NOMENCLATURE OF ELEMENTS

10; 100; 150: vehicle
14: engine (internal combustion engine)
18: flywheel damper
36: drive wheels
50: electronic control apparatus (control apparatus)
64: rotor (inertial body)
66: connection shaft (inertial body)
74: engine-stop control portion (internal-combustion-engine stop control portion)
76: engine-start control portion (internal-combustion-engine start control portion)

108: pump impeller (inertial body)
K0: first clutch (clutch)
Wrh: first resonance speed range
Wrl: second resonance speed range

What is claimed is:

1. A control apparatus for a vehicle that includes: drive wheels; an internal combustion engine; a flywheel damper connected to the internal combustion engine; at least one inertial body provided in a drive-force transmission path between the flywheel damper and the drive wheels; and a clutch configured to connect and disconnect between the flywheel damper and the at least one inertial body, the control apparatus comprising an internal-combustion-engine stop control portion configured, in a process of reduction of a rotational speed of the internal combustion engine when the internal combustion engine is to be stopped, to keep the clutch engaged in a stage until the rotational speed of the internal combustion engine has passed through a first resonance speed range, and to cause the clutch to be released before the rotational speed of the internal combustion engine reaches a second resonance speed range, wherein the first resonance speed range is a range of the rotational speed in which resonance is generated with the clutch being released, and wherein the second resonance speed range is a range of the rotational speed in which the resonance is generated with the clutch being engaged.

2. The control apparatus according to claim 1, comprising an internal-combustion-engine start control portion configured, in a process of increase of the rotational speed of the internal combustion engine when the internal combustion engine is to be started, to keep the clutch released in a stage until the rotational speed of the internal combustion engine has passed through the second resonance speed range, and to cause the clutch to be engaged before the rotational speed of the internal combustion engine reaches the first resonance speed range.

3. The control apparatus according to claim 1, wherein the internal-combustion-engine stop control portion is configured, when it is determined that the internal combustion engine is to be stopped, to stop supply of a fuel to the internal combustion engine.

4. The control apparatus according to claim 1, wherein the vehicle further includes an electric motor that is provided between the flywheel damper and the drive wheels, and wherein the at least one inertial body includes a rotor of the electric motor.

\* \* \* \* \*